P. J. MEAHL.
SELECTING MECHANISM FOR PERFORATING AND SIMILAR MACHINES.
APPLICATION FILED AUG. 11, 1908.
12,903. Reissued Dec. 29, 1908.
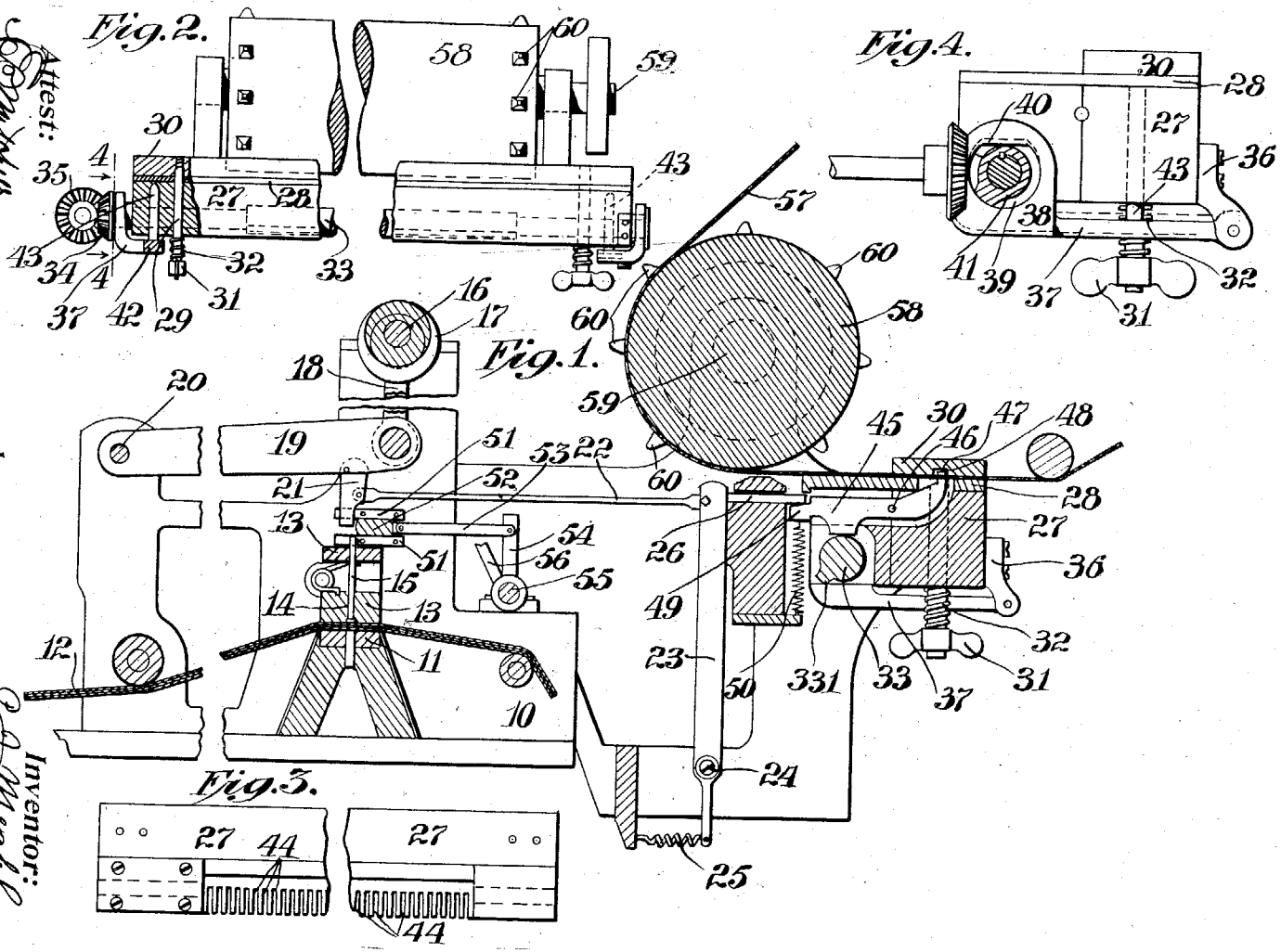
Attest:
C. Mitchell
C. S. Ashley
Inventor:
P. J. Meahl
by Geo. H. Fenn his Atty.

UNITED STATES PATENT OFFICE.

PHILIP JACOB MEAHL, OF BAYONNE, NEW JERSEY.

SELECTING MECHANISM FOR PERFORATING AND SIMILAR MACHINES.

No. 12,903. Specification of Reissued Letters Patent. Reissued Dec. 29, 1908.

Original No. 837,318, dated December 4, 1906, Serial No 316,088. Application for reissue filed August 11, 1908. Serial No. 448,077.

*To all whom it may concern:*

Be it known that I, PHILIP JACOB MEAHL, a citizen of the United States, and a resident of Bayonne, county of Hudson, and State of New Jersey, have invented certain new and useful Improvements in Selecting Mechanism for Perforating and Similar Machines, of which the following is a specification.

My invention relates to improvements in selectors for perforating and similar machines, in which a perforated master-sheet is used and in which perforations corresponding to those in the master sheet are produced in other sheets.

It will be obvious that my device may be used wherever a perforated master sheet is employed without regard to the operation performed by the machine, whether perforating, imprinting, or any other operation.

Further objects of the invention will appear in the specification and be pointed out in the claims.[b]

I have shown the machine as constructed and organized for perforating music sheets, thereby reproducing for use on a pianola or similar mechanical musical instrument the perforations in the master sheet. In former machines it has been considered necessary to use a master sheet of considerable thickness, up to three-sixteenths of an inch or more, and as the perforations in the sheets themselves are very much larger than those produced in the sheet which is to be used to control the musical instrument the master sheets are of great length, up to three hundred feet or more. When made of thick material, as heretofore, their bulk is very great, so that to store a large number of them requires a prohibitive amount of space, it being remembered that these master sheets are of great value and must be carefully preserved from fire or other injury.

My invention contemplates the use of a thin sheet of paper which can be repeatedly used without injury, owing to the peculiar mechanism employed in my primary selectors.

Another advantage of my machine as here presented is that it is capable of high speed, such machines being now in practical operation and running at a speed of seven hundred and fifty revolutions per minute. This is several times faster than any former machine with which I am acquainted, and the capacity of the machine and its economy of operation are increased in like ratio.

In the drawings, Figure 1 represents in longitudinal section so much of a perforating machine as is necessary to exhibit my invention. Fig. 2 is a partial right end view of the machine. Fig. 3 is a bottom plan view of the right end of the machine. Fig. 4 is an enlarged section through the plane 4 4, Fig. 2.

In the drawings, 10 designates the frame of the machine, in which is supported a die 11, over which is simultaneously fed step by step a plurality of sheets of paper 12, in which perforations are to be made. Supported above the die 11, and preferably forming a part thereof, is the guide 13, having vertical apertures 14, in which are supported punches 15. It is of course understood that these punches and the selecting mechanisms connected therewith correspond in number to the notes of the musical scale to be perforated upon the sheets 12. In ordinary music sixty-five of these punches and coacting parts are employed.

Mounted in the frame 10 is a shaft 16, provided with means (not shown) by which it is continuously rotated. On the shaft 16 is mounted a plurality of cams 17, each connected by a link 18 to a lever 19, which is pivoted at 20 to a stationary part of the frame 10. Pivotally connected to each lever 19 is a hammer 21, movable into and out of vertical register with a punch 15. From each hammer 21 extends forwardly a rod 22, connected to a lever 23, pivoted at 24 and provided at its lower end with a tension spring 25. Forwardly extending from the upper end of each lever 23 is a short rod 26, the function of which will appear.

Mounted at the forward end of the machine is a cross bar 27, preferably carrying on its upper face a metal plate 28. Passing through the bar 27 and at each end thereof are rods 29, the upper ends of which are firmly secured into a bar 30. On the lower ends of the rods 29 are mounted in the present instance wing nuts 31, between which and the lower side of the bar 27 are placed thrust springs 32. The rods 29 move freely in a vertical direction through the bar 27, and it is evident that the effect of the springs 32 will be to draw the bar 30 downward toward the bar 27.

Running transversely of the machine and immediately behind the bar 27 is a shaft 33, provided at one end with a bevel gear 34, meshing with a similar gear 35, connected to a continuously moving shaft on the machine, whereby the shaft 33 is also kept in continuous rotation. The shaft 33 is formed with a continuous longitudinal extension 331, constituting a cam for a purpose which will hereinafter appear.

Secured to the bar 27 are two brackets 36, on which are pivoted levers 37, the rear ends 39 of which are upwardly turned and provided with segmental apertures 39, the upper faces 40 of which are in this case horizontal. Within the apertures 39 are mounted cams 41, adapted when in contact with the arc shaped portion of the apertures 39 to depress the levers 37 and to raise the levers when the cams come in contact with the horizontal surface 40 of the apertures 39. The levers 37 are shown as provided with inwardly turned ends 42, projecting beneath the bar 27, through which pass upwardly freely sliding rods 43, which engage with the under side of the upper bar 30. The bar 27 is provided, as shown in Fig. 3, with a series of slots 44, corresponding in number to the punches 15. Each of these slots serves as a guide for a primary selector 45, shown as a lever, pivoted at 46 and having an upwardly extending finger 47, which passes through suitable apertures or slots in the plate 28. The upper bar 30 is provided with a suitable longitudinal groove or with suitable apertures 48, which receive the fingers 47. At the rear end of the lever 45 is a dog 49, adapted when the lever is in its non-operative position to abut against the end of the rod 26 on the lever 23. A spring 50, attached to each of the primary selectors 45, normally serves to depress its rear end and consequently to elevate its finger 47.

Mounted in suitable guides 51 just above the heads of the punches 15 is a cross bar 52, connected by links 53 and 54 to a rock shaft 55, which may be actuated in any desired manner to reciprocate the bar 52. In the present instance a portion of an eccentric rod 56 is shown, which in practice may be connected to a suitable eccentric on the shaft 16. (Not shown). As a means for moving a master sheet 57 over the upper surface of the plate 28 and below the bar 30 I have shown a roll 58, mounted on a shaft 59 and provided with teeth 60, which engage with suitable extra side perforations in the sheet 57 in a well known manner.

The operation of the machine is as follows:—The plurality of sheets to be perforated, (marked 12,) of which there may be fifteen or more in number, having been passed above the die 11, and below the guide bar 13 and the master sheet 57 having been placed in position with its forward end passing over the plate 28, the machine is started, it being understood that provision is made for feeding forward the plurality of sheets 12 and the master sheet 57 in unison step by step. The perforations in the master sheet are usually very much larger than those to be produced in the sheets 12, so that the speed of the master sheet is of course greater than that of the sheets to be perforated. It is also understood that the master sheet is first provided with perforations corresponding in number, position, and length to the note perforations to be produced in the sheets 12. When one of these perforations in the sheet 57 is brought to the proper position, the finger 47 on the proper lever 45 passes upward therethrough by reason of the action of the tension spring 50. This permits the depression of the rear end of the lever 45 so that the dog 49 slips below the end of the rod 26. The lever 23 is then drawn forward by the spring 25, so as to bring the corresponding hammer 21 immediately over the proper punch 15. The hammers 21 being in continuous vertical reciprocation, the punch 15 will perforate the sheets 12. The rotation of the shaft 33 will now act to raise the rear end of such of the levers 45 as have been engaged with the master sheet, so as to release the fingers 47 from the perforations in the sheet. At the same time the bar 52 is reciprocated rearwardly to force backward such of the hammers 21 as have been engaged with the punches 15. This permits the dogs 49 to again reëngage with the forward ends of the shafts 26. The master sheet 57 and the sheets 12 are then fed forward another step, when the perforating operations are repeated.

It is of course understood that if any series of the perforations in the sheet 57 is continuous the same finger 47 will continue to rise thereinto, so that two or any number of consecutive perforations will be made in the sheets 12. The steps forward by which the sheets 12 are fed are so small that these repeated perforations will form a continuous line.

It will also be seen that by properly timing the action of the cam 41 the upper bar 39 is held down on the master sheet 57, so as to hold it in close contact with the lower bar 27 except during the operation of feeding forward the sheet, when the cam will engage with the horizontal surface 40 of the aperture 39 to move the levers 47 and rods 43, whereby the upper bar 30 will be momentarily raised.

As already explained, the actuations of the moving parts are possible in my machine at the rate of seven hundred to seven hundred and fifty revolutions per minute.

What I claim is:—

1. In a machine of the class described, the combination of means for intermittently feeding forward a perforated master sheet, of a plurality of primary selectors for engaging perforations in said master sheet, a die and perforating punches, a series of punch controlling mechanisms each controlled by a primary selector and means for disengaging the punch controlling mechanisms from the primary selectors, substantially as set forth.

2. In a machine of the class described, the combination of means for intermittently feeding forward a perforated master sheet, a plurality of primary selectors for engaging the perforations in said master sheet, a die and perforating punches, a series of punch controlling mechanisms each controlled by a primary selector, a plurality of mechanisms for retracting independently the punch controlling mechanisms and the primary selectors, substantially as set forth.

3. In a machine of the class described, means for intermittently feeding forward a perforated master sheet, a part over which said master sheet is fed, a clamping bar for holding said master sheet upon said part, means for releasing said bar timed for coöperation with the movement of said feeding means, means for perforating a sheet, and primary selectors for controlling said perforating means, said selectors having fingers located adjacent to said clamping bar for engaging the perforations in said master sheet, substantially as set forth.

4. In a machine of the class described, means for intermittently feeding forward a perforated master sheet, a part over which said master sheet is fed, a recessed clamping bar for holding said master sheet upon said part, means for releasing said bar at times for coöperation with the movement of said feeding means, means for perforating a sheet, and primary selectors for controlling said perforating means, said selectors having fingers adapted to pass through the perforations in said master sheet and into the recess in said clamping bar, substantially as set forth.

5. In a machine of the class described, means for intermittently feeding forward a perforated master sheet, a plurality of primary selectors for engaging the perforations in said master sheet, a stationary perforating die, a plurality of punches, a plurality of continuously reciprocated hammers for actuating said punches, an actuating selector for each of said hammers for moving it into operative relation to one of said punches, each of said actuating selectors being controlled by one of said primary selectors, and intermittently actuated means for moving all of said hammers out of such operative relation, substantially for the purposes specified.

6. In a machine of the class described, means for intermittently feeding forward a perforated master sheet, a plurality of primary selectors for engaging the perforations in said master sheet, a stationary perforating die, a plurality of punches, a plurality of continuously reciprocated hammers for actuating said punches, an actuating selector for each of said hammers for moving it into operative relation to one of said punches, intermittently actuated means for moving all of said hammers out of such operative relation, and intermittently actuated means for retracting all of said primary selectors, both said last named intermittently actuated means being timed to operate simultaneously, substantially for the purposes specified.

7. In a machine of the class described, means for intermittently feeding forward a perforated master sheet, a part over which said master sheet is fed, a clamping bar for holding said master sheet upon said part, means for releasing said bar, a plurality of primary selectors for engaging the perforations in said master sheet, a stationary perforating die, a plurality of punches, a plurality of continuously reciprocated hammers for actuating said punches, an actuating selector for each of said hammers for moving it into operative relation to one of said punches, intermittently actuated means for moving all of said hammers out of operative relation, and intermittently actuated means for retracting all of said primary selectors, both said last named intermittently actuated means being timed to operate simultaneously, substantially for the purposes specified.

In testimony whereof I have signed this specification in the presence of two subscribing witnesses.

PHILIP JACOB MEAHL.

Witnesses:
Oscar F. Gunz,
S. M. Baeder.